US010064076B2

(12) United States Patent
Dahlman et al.

(10) Patent No.: US 10,064,076 B2
(45) Date of Patent: Aug. 28, 2018

(54) METHOD AND WIRELESS DEVICE FOR MANAGING PROBE MESSAGES (71) Applicant: Telefonaktiebolaget LM Ericsson (publ), Stockholm (SE)

(72) Inventors: Erik Dahlman, Stockholm (SE); Magnus Frodigh, Sollentuna (SE); Mikael Höök, Sollentuna (SE); Harald Kallin, Sollentuna (SE); Gunnar Mildh, Sollentuna (SE); Joachim Sachs, Sollentuna (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 23 days.

(21) Appl. No.: 15/121,561

(22) PCT Filed: Mar. 4, 2014

(86) PCT No.: PCT/SE2014/050257
§ 371 (c)(1),
(2) Date: Aug. 25, 2016

(87) PCT Pub. No.: WO2015/133941
PCT Pub. Date: Sep. 11, 2015

(65) Prior Publication Data
US 2016/0373947 A1    Dec. 22, 2016

(51) Int. Cl.
*H04L 1/00* (2006.01)
*H04W 4/00* (2018.01)
(Continued)

(52) U.S. Cl.
CPC ......... *H04W 24/06* (2013.01); *H04L 41/5009* (2013.01); *H04L 43/0805* (2013.01);
(Continued)

(58) Field of Classification Search
CPC ..... H04W 24/06; H04W 24/10; H04W 28/12; H04W 28/0205; H04W 24/04;
(Continued)

(56) References Cited

U.S. PATENT DOCUMENTS 8,325,648 B1 * 12/2012 Shah ................. H04W 72/0486
370/318
2007/0239862 A1  10/2007 Bronez et al.
(Continued)

FOREIGN PATENT DOCUMENTS

EP    2562979 A1    2/2013
EP    2566259 A2    3/2013
WO    2013177076 A1    11/2013

OTHER PUBLICATIONS

Kim, Kyu-Han et al., "On Accurate and Asymmetry-Aware Measurement of Link Quality in Wireless Mesh Networks", IEEE/ACM Transactions on Networking, vol. 17, No. 4, Aug. 2009, 1-14.
(Continued)

*Primary Examiner* — Kiet Tang
(74) *Attorney, Agent, or Firm* — Patent Portfolio Builders, PLLC (57) ABSTRACT A method and a wireless device (110) for managing probe messages are disclosed. The probe messages are used for verifying a required level of a connectivity for a service of the wireless device (110) towards a wireless network (100). The required level of the connectivity relates to likelihood of maintaining the connectivity towards the wireless network (100). The wireless device (110) estimates an estimated level of the connectivity for the wireless device (110). The wireless device (110) further adjusts an amount of the probe messages based on the required level of the connectivity and the estimated level of the connectivity. Moreover, corresponding computer programs and computer program products are disclosed.

15 Claims, 4 Drawing Sheets (51) Int. Cl.

| | |
|---|---|
| *H04B 7/185* | (2006.01) |
| *H04W 24/06* | (2009.01) |
| *H04W 24/04* | (2009.01) |
| *H04W 28/24* | (2009.01) |
| *H04W 28/02* | (2009.01) |
| *H04W 28/12* | (2009.01) |
| *H04W 24/10* | (2009.01) |
| *H04L 12/24* | (2006.01) |
| *H04L 12/26* | (2006.01) |
| *H04W 4/70* | (2018.01) |

(52) U.S. Cl.
CPC ............ *H04L 43/10* (2013.01); *H04L 43/103* (2013.01); *H04W 24/04* (2013.01); *H04W 24/10* (2013.01); *H04W 28/0205* (2013.01); *H04W 28/12* (2013.01); *H04W 28/24* (2013.01); *H04L 41/147* (2013.01); *H04W 4/005* (2013.01); *H04W 4/70* (2018.02)

(58) Field of Classification Search
CPC .. H04W 28/24; H04W 4/005; H04L 41/5009; H04L 43/10; H04L 43/0805; H04L 43/103; H04L 41/147
See application file for complete search history.

(56) References Cited

U.S. PATENT DOCUMENTS

2013/0148519 A1* 6/2013 Yu .................... H04W 24/06 370/252
2013/0336128 A1 12/2013 Shaw et al.
2013/0336234 A1* 12/2013 Ghosh ................ H04W 72/10 370/329

OTHER PUBLICATIONS

3GPP, "3rd Generation Partnership Project; Technical Specification Group Radio Access Network; Evolved Universal Terrestrial Radio Access (E-UTRA); Radio Resource Control (RRC); Protocol specification (Release 11)", 3GPP TS 36.331 V11.7.0, Mar. 2014, 1-350.

3GPP, "3rd Generation Partnership Project; Technical Specification Group Services and System Aspects; General Packet Radio Service (GPRS) enhancements for Evolved Universal Terrestrial Radio Access Network (E-UTRAN) access (Release 11)", 3GPP TS 23.401 V11.8.0, Dec. 2013, 1-286.

3GPP, "3rd Generation Partnership Project; Technical Specification Group Services and System Aspects; Policy and charging control architecture (Release 11)", 3GPP TS 23.203.V11.13.0, Mar. 2014, 1-182.

* cited by examiner

METHOD AND WIRELESS DEVICE FOR MANAGING PROBE MESSAGES

TECHNICAL FIELD

Embodiments herein relate to wireless communication systems, such as telecommunication systems. A method and a wireless device for managing probe messages are disclosed. Moreover, a corresponding computer program and a computer program product are disclosed.

BACKGROUND

Today wireless communication systems are mainly used for human-centered communication and services. A trend is, however, to use wireless communication systems for communication and services mainly involving machines. This kind of communication and services are often referred to as Machine-to-Machine (M2M) communication.

Certain types of communication and services within M2M communication are expected to require that a wireless connection, provided by the wireless communication systems, is highly reliable. The wireless connection is required to be highly reliable both in terms of loss of the wireless connection and the possibility of establishing the wireless connection. In the following, the term "reliable" is used in this context. Therefore, for the above mentioned certain types of communication and services within M2M communication, a high reliability of the connection, or the possibility to establish connection, may be said to be required.

This kind of high reliability may also be required for Person-to-Machine (P2M), Person-to-Person (P2P) and Machine-to-Person (M2P) communication.

Services that may need this kind of high reliability include industrial process control services, services for alarm monitoring, services in smart grid applications, control and management of business and/or mission critical processes or services, services for monitoring critical infrastructure and services towards responders in the national security and public safety segment and other similar services.

Furthermore, high reliability for certain services may be beneficial where deployment of nodes, such as radio base station, radio network controller etc., is particularly costly. At the same time, it is desired to achieve sufficient capacity, e.g. in terms of number of connected devices, and/or coverage for the services.

Consider for example a device, such as smart meters for a smart grid, a metering, sensing or activation device, that is deployed in a network at a remote location at high cost. If there would be a failure in communication with such a device e.g. due to bad coverage and/or insufficient capacity, a manual restoration of the communication with the device or a replacement of the device with another device would be required to compensate for the failure. Such compensation may imply high labor costs, which would scale in an unacceptable manner when there are a great number of devices which often is the case in application of M2M communication.

It is known to provide connectivity for M2M devices in a number of different ways using e.g. wired or wireless connections. The wired connections may be copper wires, optical fibers, Ethernet cables or the like. The wireless connections may be provided by use of various Radio Access Technologies (RATs), such as Wi-Fi, Evolved Universal Terrestrial Radio Access Network for Long Term Evolution (EUTRAN/LTE), Universal Terrestrial Radio Access Network for High Speed Packet Access (UTRAN/HSPA), Global System for Mobile communication (GSM) for Enhanced Data GSM Environment (EDGE) Radio Access Network (GERAN) and the like. Moreover, evolutions of the aforementioned RATs as well as other Third Generation Partnership Project (3GPP) networks may be used to provide the wireless connection.

During planning of the radio access networks and/or telecommunication systems mentioned above, it is sometimes desired to set up the radio access network such as to provide a high reliability for M2M devices. High connectivity could then be provided in the following ways.

For example, the radio access network could be deployed as over-dimensioned in terms of transport and/or radio link resources. Over-dimensioning of transport resources may refer to use of optical fibers for communication from a base station, while a peak bit-rate from the base station is 800 Megabits per second and an optical fiber may handle tenth of Gigabits per second. Over-dimensioning of radio link resources refers to deployment of more base stations, antennas, use of more frequency bands, etc. than needed according to an estimated network load. The RAN is said to be over-dimensioned when it is deployed to be able to handle a worst case scenario while still having resources that are available for any upcoming communication.

As another example, so called node availability may be increased by introducing redundancy in a node by installing multiple power units for powering of the node. The node availability may relate to availability of e.g. transport nodes, radio nodes and server nodes, which communicate with the M2M device or control or support the network operation. Node availability decreases on failure of a node, which typically happens when power units for powering of the node breaks down.

As a further example, in some specific network segments, multiple paths could be introduced to avoid single point of failure. An optical fiber ring is able to cope with interruptions of one optical link by routing information in the opposite direction as compared to where the interrupted optical link is located.

In a known wireless network, a monitoring procedure to monitor that a wireless connection is working properly is performed as follows. The wireless network comprises a first network device and a second network device which are inter-connected by a wireless connection.

Hence, in order to check that the wireless connection is working properly, the first network device sends so called heart-beat messages to the second network device. The heart-beat messages are sent from a service executing in the first network device. The wireless connection is said to work properly when the wireless connection fulfills certain requirements relating to the service. The certain requirements are as an example given by a so called Quality Class Indicator which is known from 3GPP Technical Specification (TS) 23.401, section 4.7, and TS 23.203, e.g. Table 6.1.7, which gives standardized QCI values.

In response to a heart-beat message, received at the second network device, the second network device sends a response message. When the first network device receives the response message, the first network device may conclude that the wireless connection is not broken. This means that the first network device concludes that the wireless connection is broken when a time period from the sending of the heart-beat message to the reception of the response message is above a threshold value. At deployment of the wireless network, a configuration of the monitoring procedure, such as periodicity of heart-beat messages sent, the threshold value etc., is determined.

With another monitoring procedure in the same known wireless network as above, the first network device sends so called probe messages. In contrast to the heart-beat message, probe messages are typically sent unconditionally from the first network device. At deployment of the wireless network, the second network device is configured with information about the probe messages sent by the first network device. The information about the probe message may include timing information about when the probe messages are sent and the like. The information about the probe message may be sent to the second network device by means of a suitable configuration message, which carries said information about the probe messages. In this case, the second network node is able to detect that the wireless connection is broken without any need for response message as in the example above. The second network device may detect the broken wireless connection by registering one or more missing, i.e. not received by the second network device, probe messages, since the second network device expects to receive probe messages according to the configuration applied at deployment.

A problem with the known wireless network may be that the applied configuration of the monitoring procedures mentioned above may sometimes not be efficient.

SUMMARY

An object may be to improve probing of a wireless connection for a service in a wireless network as mentioned above.

According to a first aspect, the object is achieved by a method, performed by a wireless device, for managing probe messages for verifying a required level of a connectivity for a service of the wireless device towards a wireless network. The required level of the connectivity relates to likelihood of maintaining the connectivity towards the wireless network. The wireless device obtains an estimated level of the connectivity for the service. The wireless device further adjusts an amount of the probe messages based on the required level of the connectivity and the estimated level of the connectivity. The probe messages are sent, by the wireless device, to the wireless network for verification of the required level of the connectivity.

According to a second aspect, the object is achieved by a wireless device configured to manage probe messages for verifying a required level of a connectivity for a service of the wireless device towards a wireless network. The required level of the connectivity relates to likelihood of maintaining the connectivity towards the wireless network. The wireless device is configured to obtain an estimated level of the connectivity for the service. The wireless device is configured to adjust an amount of the probe messages based on the required level of the connectivity and the estimated level of the connectivity. The probe messages are sent, by the wireless device, to the wireless network for verification of the required level of the connectivity.

According to a third aspect, the object is achieved by a computer program for managing probe messages. The computer program comprises computer readable code units which when executed on a wireless device causes the wireless device to perform the method in the wireless device as described herein.

According to a fourth aspect, the object is achieved by a computer program product, comprising a computer readable medium and a computer program as described herein stored on the computer readable medium.

The wireless device adjusts the amount of probe messages based on the required level of the connectivity and the estimated level of the connectivity. In this manner, the wireless device may dynamically adapt the amount of probe messages to a relation between the required level of the connectivity and the estimated level of the connectivity. It shall be understood that the estimated level of the connectivity changes dynamically with radio conditions, traffic load etc. of the wireless network.

It shall also be mentioned that the required level of the connectivity may be a default level of the connectivity. When the estimated level of the connectivity is above the default level, the wireless device may consider the estimated level of connectivity to be high. In some examples, the required level of the connectivity may be as required by the service as elaborated in the detailed description.

An advantage with embodiments herein is that power consumption of the wireless device may vary in accordance with the relation between the required and estimated levels of the connectivity. For example, power consumption may be reduced when the relation indicates that the estimated level of the connectivity is greater than the required level of the connectivity, which may cause the wireless device to reduce the amount of probing. A reduction of the amount of probing may at the same time to lead to less use of network resources, e.g. in terms of time slots and/or frequencies for sending of probe messages. Frequencies may here refer to carriers, subcarriers, frequency spectrum, bandwidth etc.

BRIEF DESCRIPTION OF THE DRAWINGS

The various aspects of embodiments disclosed herein, including particular features and advantages thereof, will be readily understood from the following detailed description and the accompanying drawings, in which.

DETAILED DESCRIPTION

Throughout the following description similar reference numerals have been used to denote similar elements, units, modules, circuits, nodes, parts, items or features, when applicable. In the Figures, features that appear in some embodiments are indicated by dashed lines unless otherwise noted.

Figure 1:
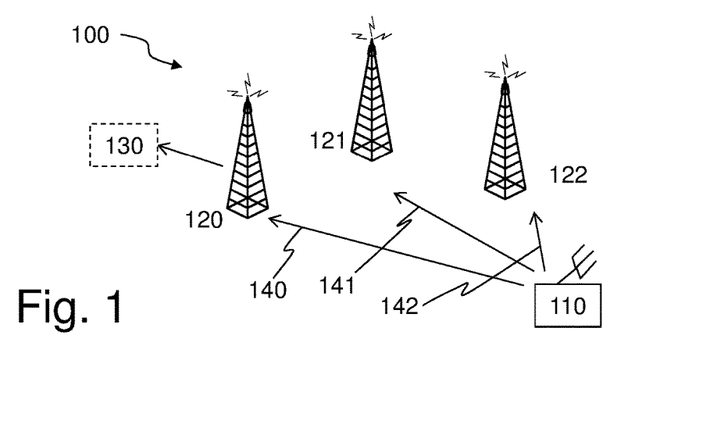
FIG. 1 is a schematic overview of an exemplifying wireless network in which embodiments herein may be applied.

FIG. 1 depicts an exemplifying wireless network 100 in which embodiments herein may be implemented. In this example, the wireless network 100 is a Long Term Evolution (LTE) system. In other examples, the wireless network may be any cellular or wireless communication system, such as a Wideband Code Division Multiple Access (WCDMA)

network, a Global System for Mobile communication (GSM network), Wireless Fidelity (Wi-Fi) or the like.

A wireless device 110 is also depicted in FIG. 1. The wireless network 100 may comprise the wireless device 110. As used herein, the term "wireless device" may refer to a user equipment, a machine-to-machine device, a mobile phone, a cellular phone, a Personal Digital Assistant (PDA) equipped with radio communication capabilities, a smartphone, a laptop or personal computer (PC) equipped with an internal or external mobile broadband modem, a tablet PC with radio communication capabilities, a portable electronic radio communication device, a sensor device equipped with radio communication capabilities or the like. The sensor may be any kind of weather sensor, such as wind, temperature, air pressure, humidity etc. As further examples, the sensor may be a light sensor, an electronic switch, a microphone, a loudspeaker, a camera sensor etc. The term "user" may indirectly refer to the wireless device.

Furthermore, the wireless network 100 comprises a radio network node 120 and two further radio network nodes 121, 122, which may be referred to as the radio network nodes 120, 121, 122. As used herein, the term "radio network node" may refer to an evolved Node B (eNB), Node B, a control node controlling one or more Remote Radio Units (RRUs), a radio base station, an access point or the like.

In some examples, the wireless network 100 further comprises a network node 130. When the wireless network 100 is a LTE system, the network node 130 may be a Packet Data Network Gateway (PGW).

When operating the wireless network 100 according to embodiments herein, probe messages, which will be further explained below, may be sent 140, 141, 142 from the wireless device 110 to various nodes in the wireless network 100, such as the radio network node 120, one or both of the two further radio network nodes 121, 122, and/or the network node 130 (e.g. via the radio network node 120).

Before the embodiments herein are described, level of connectivity, as a concept, is explained with reference to the block diagrams in FIG. 2 and FIG. 3.

Level of connectivity may also be referred to as connectivity availability. Generally, the level of connectivity is herein defined as a probabilistically guaranteed promise that some sufficiently good connectivity, which e.g. fulfils service requirements for a specific M2M service, can be provided at or above some degree of likelihood. Service requirements are further described in section "service requirements" below. In some examples, the level of connectivity may be a value relating to likelihood of maintaining the connectivity towards the wireless network 100, such as the radio network node 120 and/or the network node 130, for a service, such as the specific M2M service or the like.

Figure 2:
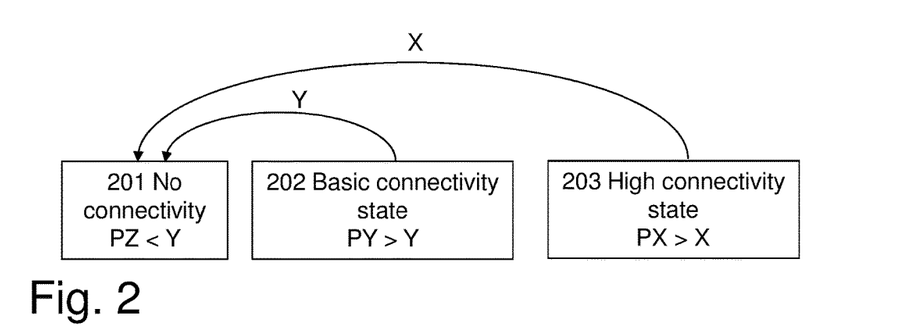
FIG. 2 is a block diagram illustrating states relating to level of connectivity.

FIG. 2 shows a block diagram illustrating three exemplifying states relating to levels of connectivity. The three exemplifying states includes a first state 201 with no connectivity, a second state 202 with basic level of connectivity and a third state 203 with high level of connectivity.

In this example, a level of connectivity is given by a probability value between 0 and 1. Therefore, the level of connectivity may be a digit, a value, a string of bits or the like, which is representing some specific level of connectivity. Thus, the level of connectivity relates to likelihood, or probability, for a service, executed in the wireless device 110, to maintain connectivity to the wireless network 100 and/or e.g. the radio network node 120 and/or the network node 130.

To maintain the connectivity means that the wireless device 110 may maintain, i.e. not drop, a wireless connection that has been established.

Moreover, to maintain the connectivity means that the wireless device 110 may establish, or set up, a wireless connection successfully with likelihood given by the probability value. Since the connectivity applies to the service, expressed herein as connectivity for the service, service requirements for the service are accordingly fulfilled by the connectivity, e.g. the wireless connection, be it an already exiting connection or a connection to be set up.

With the concept of level of connectivity, a required level of the connectivity shall be distinguished from an estimated level of the connectivity.

The required level of the connectivity may be determined by the service, i.e. the service, or in fact a person providing or handling the service, may set the required level of the connectivity to a certain values, e.g. 0.9. For this reason, the required level of the connectivity may be referred to as a desired, or even required, level of the connectivity. As mentioned above, level of connectivity in general may be represented by values between 0 and 1. Thus, a value of 0.9 may be considered to represent a high level of connectivity. The required level of the connectivity may also be a default level of the connectivity. The default level of the connectivity may apply for a particular service or a group of services. In other examples, the required level of the connectivity may be represented by descriptors as "poor", "medium", "high" or the like, which descriptors in turn may be associated with certain ranges of the level of the connectivity.

The required level of the connectivity may, additionally or alternatively, be set by a network node, comprised in the wireless network 100. The network node may handle requests for services and/or connections therefore. As an example, the network node may be an eNB in LTE, a Radio Network Controller (RNC), Mobility Management Entity (MME), Serving General Packet Radio Service Support Node (SGSN), Policy and Charging Rules Function (PCRF), Home Subscriber Server (HSS), Home Location Register (HLR) or the like. When the network node sets the required level of the connectivity, it may set different levels of the connectivity for different services, different users, i.e. different nodes such as the wireless device 110, different user groups, different types of devices and the like. The different users, or user groups, may be different in terms of subscriptions, home network etc. The different types of devices may be different in terms of being mobile or stationary, a user device or a machine device and the like.

The estimated level of the connectivity may for example be determined as described in section "Determining level of connectivity". The estimated level of the connectivity depends on radio conditions, traffic load etc. in the wireless network 100. Therefore, the estimated level of the connectivity reflects actual, or real, level of the connectivity for the service towards the wireless network. The estimated level may thus correspond to an actual, or current, level of the connectivity. As a consequence, when the estimated level is increased, or decreased, it means that the actual level of the connectivity, which the estimated level is an estimate of, is in fact increased, or decreased. The increase or decrease of the estimated level may occur due to that certain actions, e.g. relating to ensuring of the required level of the connectivity, as described herein are performed.

As described above, the level of the connectivity may be expressed as probability for a service to maintain connectivity to the wireless network 100. This means that the probability may be linked to a time period. Hence, as an example, the probability of losing the connectivity during an upcoming (future) time period is 0.9. In other examples, the probability may relate to that an event occurs. The event may e.g. be that a fire alarm report is in fact received by a probability of 0.9999 which would set a requirement that there is connectivity when the fire alarm actually goes off.

Furthermore, the level of the connectivity may be expressed as Mean Time Between Failures (MTBF). For example, when the MTBF of the connectivity is 100 years, failure is very rare.

The three exemplifying states relating to levels of the connectivity may be seen as a quantization of the levels of the connectivity.

In FIG. 2, threshold values X and Y for deciding when to consider the service to be in any one of the three states 201, 202, 203 relating to levels of the connectivity are indicated. Expressed differently, an exemplifying M2M device (not shown) may be in one of the three states depending on relations between an estimated probability value relating to the level of the connectivity and the threshold values X and Y. The M2M device may be an example of the wireless device 110 and/or the radio network node 120.

The estimated probability value may be given, e.g. indirectly or directly, by the estimated level of the connectivity. Hence, the estimated probability value may be given indirectly by the estimated level of the connectivity when the estimated level of the connectivity represents a probability. For example, when the estimated level of the connectivity is equal to 300, it represents e.g. a probability of 0.7. This means that the estimated level of the connectivity may need to be translated, interpreted or the like, before it can be used as a probability value. Alternatively, the estimated probability value may be given directly by the estimated level of the connectivity when the estimated level of the connectivity is e.g. equal to 0.7. In this case, the estimated level of the connectivity can be used directly without a need for translation, interpretation or the like, since probability values range from zero to one.

The three states are in this example defined as follow, starting with the third state 203 for ease of explanation. In order to find out in which state the service is the estimated probability value may be determined as mentioned above. Throughout this example, it is assumed that the same service requirements for the service apply in all states.

High Connectivity State

The M2M device may be in a so called high connectivity state aka the third state. The connectivity may be considered high if the estimated probability value, here denoted PX, is e.g. above a threshold X. While using the reference numerals in the Figure, we have that PX>X.

Basic Connectivity State

The M2M device may be in a so called basic connectivity state aka the second state. While assuming in this example that the estimated probability value is PY, the connectivity may be considered to be basic if PY is e.g. above a threshold Y. At the same time, PY is not high enough to reach the high connectivity state, i.e. the estimated probability value PY is less than the threshold X. While using the reference numerals in the Figure, we have that Y<PY<X.

No Connectivity

The M2M device may be in a state of no connectivity aka the first state. In this state, the M2M device has no connection to the network or a connection that does not fulfil the service requirements, and the M2M device has therefore no service. Furthermore, the M2M device may not have, as far as it can be estimated, any possibility to obtain a connection. This means that the estimated probability value, now denoted by PZ, is not high enough to reach the basic connectivity state. As an example, the M2M device may be out-of-coverage in view of the wireless network 100. While using the reference numerals in the Figure, we have that PZ<Y.

In the description above, the M2M device is said to be in the different states mentioned above for reasons of simplicity. In some examples, in case a M2M device runs multiple services, each of those multiple services may be said to be in the different states. Some or all of the multiple services may be in the same state or all of the multiple services may be in a respective state.

In the following description, two example scenarios will be referred to in order to improve understanding.

In a first exemplifying scenario, the wireless network 100 is included in, or forms a part of, a traffic control system, which includes various entities, e.g. traffic lights, vehicle such as car and trucks, bicyclists carrying cellular phones. At least some of the entities communicate over the wireless network 100. This means that some entities of the traffic control system may be within the wireless network 100 and some other entities may be outside the wireless network 100.

As an example, some functions related to control of vehicles etc. can be automated when the high connectivity state is reached or available, but these functions need to operate in a half-automatic or manual mode for safety reasons when only basic connectivity state is reached or available.

In a second exemplifying scenario, the wireless network 100 is included in an industrial control system or power system. The industrial control system may comprise various entities, such as valves, transportation belts, spray devices for painting or physical/chemical treatment etc. At least some of the entities communicate over the wireless network 100. This means that some entities of the industrial control system may be within the wireless network 100 and some other entities may be outside the wireless network 100.

The industrial control system may operate at lower margins with higher efficiency, e.g. higher yield, when the entities communicating over the wireless network 100 have high connectivity state, e.g. with bounded latency, compared to when the entities only have basic connectivity state, which would require higher margins since the industrial control system needs e.g. more time to react, treat, open/close valves etc.

In the second scenario, it may be that the industrial control system is operated based on local information, or half-automatic mode, when the entities communication over the wireless network 100 have low connectivity state. Local information may have been stored in the entities prior to the low connectivity state.

Figure 3:
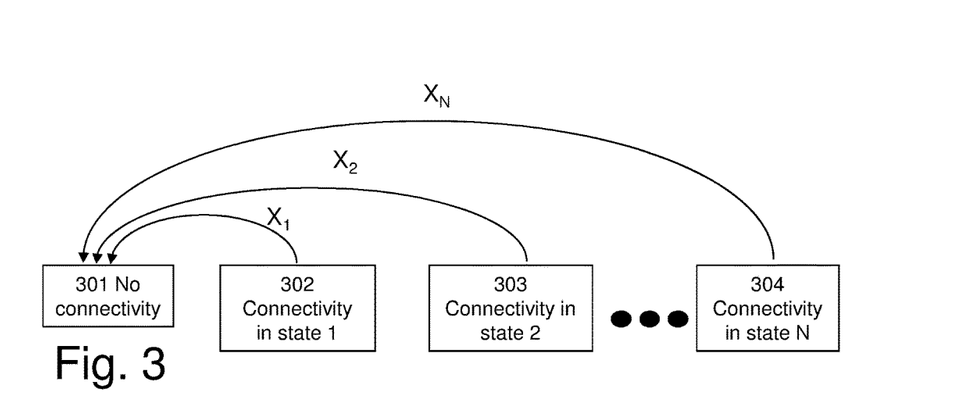
FIG. 3 is another block diagram illustrating states relating to level of connectivity.

In FIG. 3, another block diagram illustrates a more general case with N number of states relating to level of connectivity. As illustrated in this Figure, the states shown in FIG. 2 may be extended to include additional states with different levels of connectivity, e.g. with different transition probabilities X1 . . . XN for transition from one state to another.

Figure 4:
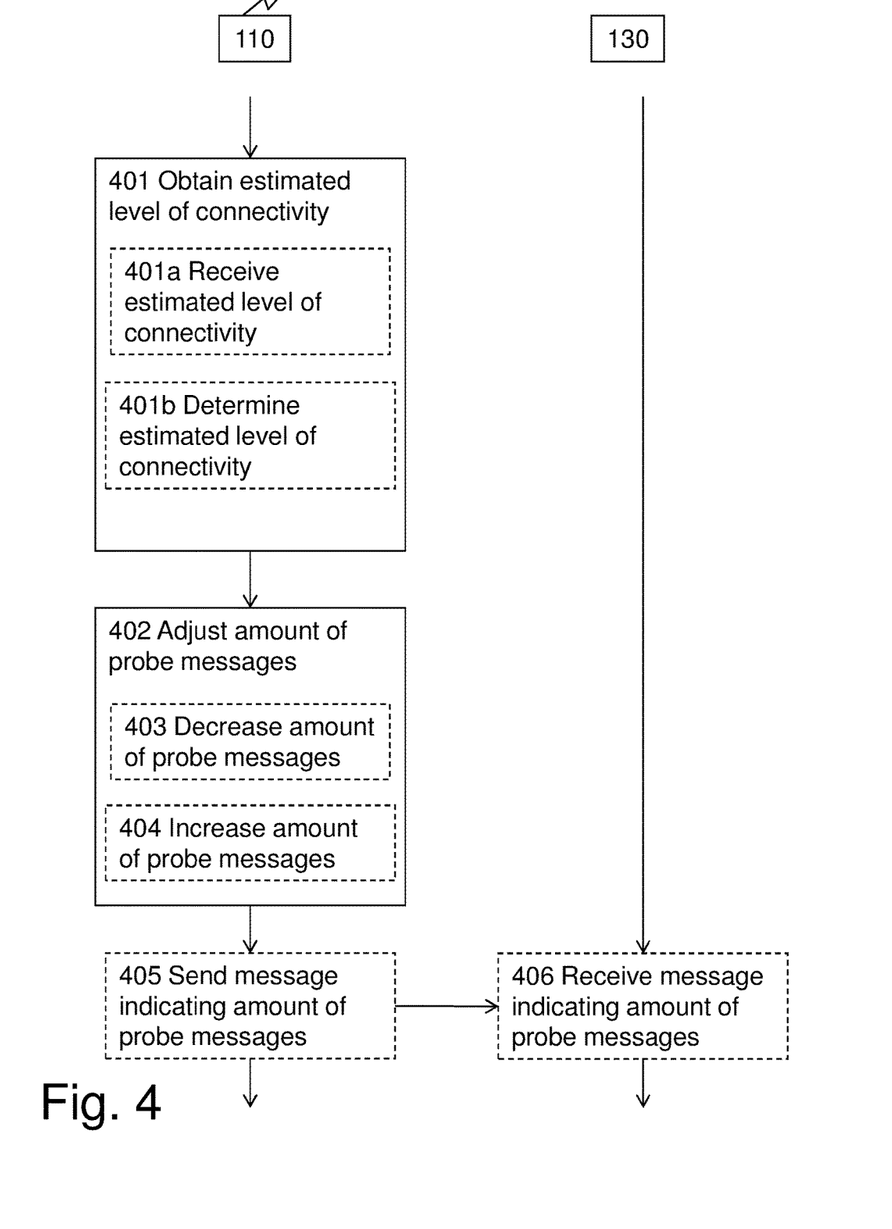
FIG. 4 is a schematic, combined signaling scheme and flowchart illustrating embodiments of the methods.

FIG. 4 illustrates an exemplifying method according to embodiments herein when implemented at least partly in the wireless network 100 of FIG. 1. Thus, the wireless device 110 performs a method for managing probe messages for verifying a required level of a connectivity for a service of the wireless device 110 towards the wireless network 100.

As mentioned, the required level of the connectivity relates to likelihood of maintaining the connectivity towards the wireless network 100.

With regard to the verification of the required level, it may be that the wireless device 110 or the wireless network 100 wishes to verify the required level of connectivity as will be explained in detail below in its relevant context.

The following actions may be performed in any suitable order.

Action 401

In order for the wireless device 110 to use an estimated level of the connectivity in action 402 below, the wireless device 110 obtains the estimated level of the connectivity for the wireless device 110.

Action 401*a*

According to a first manner of obtaining the estimated level of the connectivity, the wireless device 110 receives the estimated level of the connectivity for the service from the wireless network 100. The wireless network 100 may determine the estimated level of connectivity as described in section "Determining level of connectivity" below.

Action 401*b*

According to a second manner of obtaining the estimated level of the connectivity, the wireless device 110 determines the estimated level of the connectivity for the service.

In a first example, the estimated level of the connectivity may be based on a number of connections for the wireless device 110. The expression "connections for the wireless device 110" may refer to existing connections, i.e. connections that the wireless device 110 uses. Additionally, the expression "connections for the wireless device 110" may refer to connections that potentially may be established, i.e. connections that the wireless device 110 is capable of setting up and using. Therefore, as a description of both existing and potential connections, it may be said the number of connections are usable by the wireless device 110.

In order to further elaborate the first example, it may be that when the number of connections is considered, by the wireless device 110, to be high, e.g. above a threshold value, the estimated level of the connectivity will be estimated to be high as well. Similarly to the above, the estimated level of the connectivity will be considered high when approaching the value of one, which indicates a probability of one hundred percent that the connection is maintained.

In a second example, the estimated level of the connectivity may be based on quality of connections for the wireless device 110. As mentioned above, level of the connectivity generally relates to likelihood for a service of the wireless device 110 to maintain connectivity. Hence, if quality of connections is such that the service requirements may be fulfilled with a margin, the level of the connectivity may be set in proportion to the margin.

In other words, the first and second example specifies that the estimating of the estimated level of the connectivity may be based on one or more of number of connections for the wireless device 110, quality of connections for the wireless device 110 and the like.

Further examples of how to obtain the estimated level of the connectivity are described in section "Determining level of connectivity" below.

Action 402

Now that the wireless device 110 have obtained the estimated level of the connectivity, the wireless device 110 adjusts an amount of the probe messages based on the required level of the connectivity and the estimated level of the connectivity. The probe messages are sent, by the wireless device 110, to the wireless network 100 for verification of the required level of the connectivity.

The amount of the probe messages may relate to one or more of:

a periodicity at which the probe messages are sent from the wireless device 110;

number of cells to which the probe messages are sent;

number of radio access technologies used when the probe messages are sent;

number of carriers used when the probe messages are sent, and the like.

The periodicity at which the probe messages are sent from the wireless device 110 may be an indication of in which time slots, the wireless device 110 may send the probe messages. The periodicity may sometime be given by a frequency value.

The number of cells, typically per each radio access technology used, to which the probe messages are sent may relate to a number of radio network nodes, such as the radio network nodes 120, 121, 122, to which the probe messages are sent or broadcast.

The number of radio access technologies used when the probe message are sent may be that one radio network node, such as the radio network node 120, is a multi-RAT radio network node. Then, it may be that the probe messages are sent on connections using some or all of these multi-RATs in order to adjust the amount of probe messages sent.

The number of carriers, or carrier frequencies, used when the probe messages are sent may be that one radio network node, such as the radio network node 120, is capable of transmitting and receiving at a plurality of frequencies. Then, it may be that the probe messages are sent on connections using some or all of the plurality of frequencies in order to adjust the amount of probe messages sent.

As already mentioned above, the amount of probe message may relate to a combination of one or more of the above mentioned definitions relating to the amount of probe messages. Hence, the adjusting of the amount of the probe messages may be an adaption of number of the probe messages sent over various connections, or links, according to the above.

Action 403

In some embodiments, the wireless device 110 decreases the amount of probe messages when a difference between the required level of the connectivity and the estimated level of the connectivity exceeds a threshold value. The amount of probe messages may be decreased in various manners, such as stepwise or in proportion to the difference as in the following example.

As an example, a degree of the decrease may be proportional, at least to some extent, to the difference between the required and estimated levels of the connectivity. This means for example that when the estimated level of the connectivity is much greater than, e.g. compared to a threshold, the required level of the connectivity, the amount of the probe messages may be reduced more than if the estimated level of the connectivity is only slightly greater than the required level of the connectivity.

Figure 6:
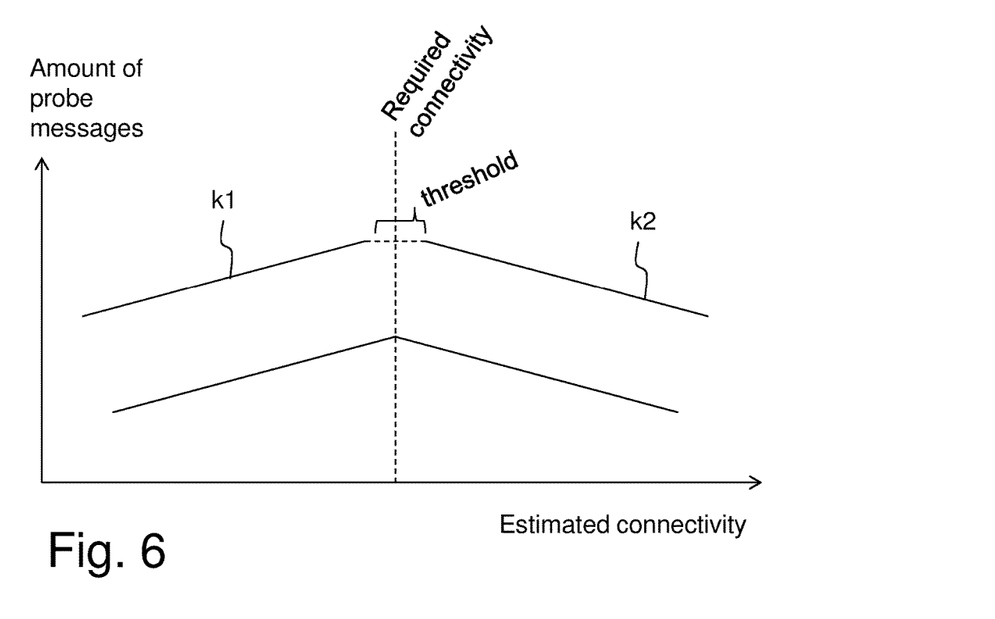
Figure 7:
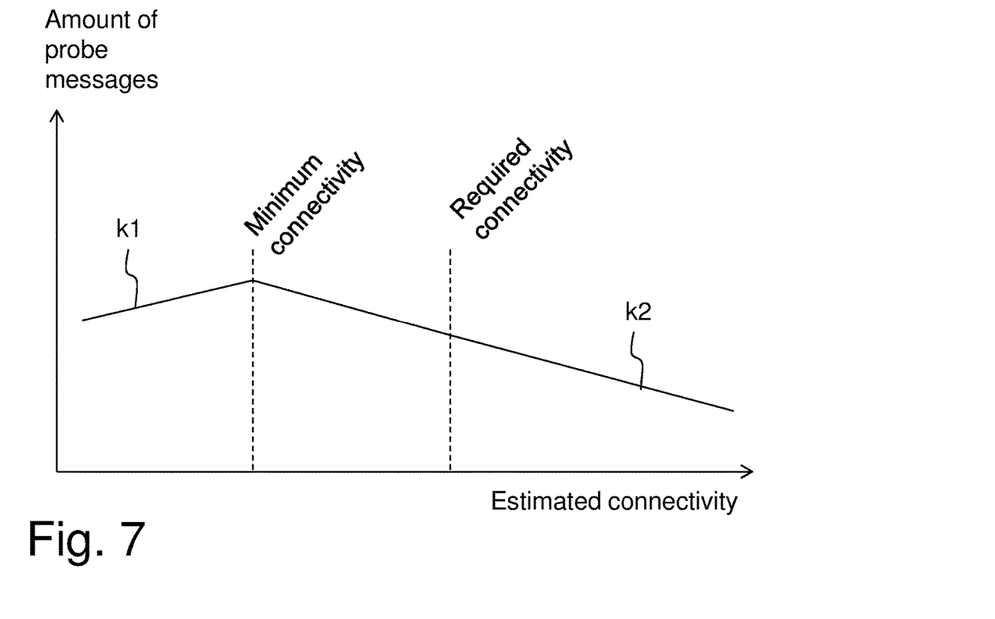
FIG. 7 is another graph illustrating the amount of probe messages as a function of the estimated level of the connectivity.

In yet further examples, the adjusting may be that the amount of probe messages is set according to e.g. a linear function in proportion to the difference as in FIG. 6. In this example, a slope, or gradient, of a graph illustrated in FIG. 6 is k1 and k2. Here, k1 and k2 are chosen to be equal for both when the estimated level of connectivity approaches the required level of the connectivity from the left and the right as seen in the Figure. In other examples, such as in FIG. 7, different values of k1 and k2 may be chosen. FIG. 7 will be described in more detail after the description of the combined signaling scheme and flowchart of FIG. 4.

Action 404

It may be suitable to combine action 404 with the embodiments of action 403. Hence, when the difference approaches the threshold value, the wireless device 110 increases the amount of probe messages. The amount of probe messages may be increased in various manners, such as stepwise or in proportion to the difference as in the following example.

Similarly to the example of action 403, a degree of the increase may be proportional, at least to some extent, to the difference between the required and estimated levels of the connectivity. This means for example that when the estimated level of the connectivity is much less than, e.g. compared to a threshold, the required level of the connectivity, the amount of the probe messages may be increased more than if the estimated level of the connectivity is only slightly less than the required level of the connectivity.

In yet further examples, the adjusting may be that the amount of probe messages is set according to e.g. a linear function in proportion to the difference similarly as described above in relation to action 403. This implies that different values of k1 and k2 may be used depending on whether the estimated level of the connectivity approaches the required level of the connectivity from the right or left as shown in FIG. 7.

Thanks to the threshold value a so called Ping-Pong effect may be avoided. The Ping-Pong effect implies that when the estimated level of the connectivity varies in a small range, extending above and below the required level of the connectivity, it will cause the wireless device 110 to frequently, and possibly alternatingly, decrease and increase of the amount of probe messages.

Action 403 and 404 may be described as that the adjusting of the amount of probe messages may comprise decreasing the amount of probe messages when a difference between the required level of the connectivity and the estimated level of the connectivity exceeds a threshold value, and increasing the amount of probe messages when the difference approaches the threshold value.

Action 405

In order to inform the wireless network 100 about the amount of the probe messages, the wireless device 110 may send a message indicating the amount of the probe messages to the wireless network 100, such as the network node 130, which may cooperate with the service of the wireless device 110.

In this manner, the wireless network 100 may be made aware of a structure of the probe messages. The structure may be given by in which time slots the probe messages are sent, on which resources, such as connections, the probe messages are sent by the wireless device 110, by use of which radio access technology and the like.

When the wireless network 100 is aware of the structure of the probe messages, it is possible for the wireless network 100 to verify that the probe messages are received as given by the structure. Hence, the wireless network 100 may detect deviations, in the sending of the probe messages, from the structure. Thereby, the wireless network 100 may deduce that the required level of the connectivity is or is not achieved.

At this stage, or even after action 402, the wireless device 110 may send (not shown in FIG. 4) the probe messages while applying the adjusted amount of probe messages. Hence, the structure, as in action 405, for the sending of the probe messages is applied.

As mentioned, FIG. 7 is now going to be described. In FIG. 7, a minimum level of the connectivity is also introduced. A motivation for the minimum level of the connectivity may be that even if the required level of the connectivity is not fulfilled it may be possible to run the service. Hence, if the amount of probe message now is increased as the estimated level of the connectivity approaches the minimum level of the connectivity, it may be said that it is compensated for that the required level of the connectivity is not reached. This compensation is achieved thanks to that the connectivity is probed e.g. more frequent. This means that a possible loss of connectivity, i.e. below the minimum connectivity, may be detected before any failure may have occurred. Thus, it is possible to take appropriate actions such as to ensure that the required level of the connectivity is met.

Now a few more exemplifying embodiments will be described.

In a first exemplifying embodiment, the wireless device 110 has two or more connections to the wireless network 100, e.g. through different radio access technologies.

Then, the wireless device 110 probes, e.g. sends probe messages, on all connections to see if there is connectivity to e.g. the network node 130, such as a server or controller for the service of the wireless device 110.

In order to adjust the amount of probe messages, the wireless device 110 estimates the estimated level of the connectivity by measuring quality of each connection. The quality may be measured in terms of path loss or the like.

In case the quality of each connection is above a certain threshold, the wireless device 110 continues to probe only one of the connections for connectivity at a regular interval. Thus, the amount of probe messages is decreased.

In case the quality of the connection is low, i.e. below another threshold, for one or more of the connections, the wireless device 110 may decide to continue to probe each connection for connectivity at a regular interval. Thus, the amount of probe messages is maintained.

In a second exemplifying embodiment, the wireless device 110 has a single connection to the wireless network 100 and to e.g. the network node 130, such as a server for the service of the wireless device 110.

Then, the wireless device 110 will continuously probe this connection to verify the connectivity to e.g. the network node 130, such as a server or controller for the service of the wireless device 110.

A frequency of the probing may be decreased, by the wireless device 110, in several different situations as listed here. The several different situations include situation when:
 quality of the connection exceed a certain threshold,
 variation of quality of the connection remain below a certain threshold for a certain time period,
 there are many alternative connections available indicated by a neighboring radio network node, such as one of the two further radio network nodes 121, 122 (the alternative connections may be provided in another cell, frequency or radio access technology),
 the wireless device 110 is stationary as determined by known positioning methods.

When the several different situations as mentioned above cannot be identified by the wireless device 110, the frequency of the probing may be increased by the wireless device 110. The frequency of the probing may be an example of the amount of probe messages discussed in connection with FIG. 4.

Determining Level of Connectivity

As mentioned, the wireless network 100 may determine the level of the connectivity based on one or more conditions relating to at least one connection for the wireless device 110, the network node 120 and/or the service. In the following the term "M2M device" will be used to refer to the wireless device 110, the radio network node 120 and/or the service.

The expression "a connection for the M2M device" refers to that a connection is usable by the M2M device.

The connection that is useable by the wireless device 110 shall be understood to mean a connection which the M2M device is capable of using or which the M2M device already uses. The connection that the M2M device is capable of using may be called a potential or possible connection. Thus, the potential connection for the M2M device is not yet established, i.e. the M2M device is not attached to the wireless network 100 by means of such potential connection.

An already used connection does not necessarily mean that the connection is actively used for transmission of data. Instead, it is enough that the already used connection is established between the wireless device 110 and e.g. the second node 120. For LTE, this means that the wireless device 110 can be in either so called idle mode or connected mode, which modes are referred to as RRC_IDLE and RRC_CONNECTED in Technical Specification (TS) 36.331 of the 3GPP group.

In the following examples, criteria for when to consider the level of connectivity to be high are given.

As a first example, the conditions relating to the at least one connection for the M2M device include, as mentioned, the number of connections for the M2M device.

At least U number of possible connections, which sometimes may be called connectivity links or paths, may be provided to the M2M device at a sufficiently good link quality.

Possible connections may be:
connections of the same radio technology, e.g. same or different frequency carriers, but e.g. to different base stations,
connections of the same radio technology to the same base stations but at different frequencies,
connections provided via different radio technologies, e.g. to the same or different base stations,
connections that provide connectivity to different access networks/operators,
fixed/wired connections, such as copper wires and the like.

Base station may here refer to radio network nodes, access points, relay nodes, repeaters and the like.

For the case above, the different connections can either be established simultaneously to the device or in case only some of the connections are established it is predicted, based e.g. on measurements, that it would be possible to establish the alternative connections in case the first set of connections are deemed lost.

As a second example, the conditions relating to the at least one connection for the M2M device include, as mentioned, the quality of connections for the M2M device.

The connections of the M2M device may be provided at a desired QoS level with a significant so called link margin.

For example, when the required transmit power of the M2M device is consistently X dB below the permitted power as determined by the wireless network 100 e.g. depending on interference restrictions.

As other example, the required radio resources for a connection are consistently Y % less than what is allocated, or available, for a connection. In detail, this may be that only half, i.e. Y=50%, of the bit rate specified for the connection, i.e. a Guaranteed Bit Rate (GBR) bearer, is used.

As a third example, the conditions relating to the at least one connection for the M2M device include, as mentioned, the variance of quality of connections for the M2M device. When the variance of quality of connections is below Z for all or at least S number of connections, then the level of connectivity may be considered high, assuming the average quality of the connections is considered good as is explained in the example below.

An example of quality of connections is connection margin, or link margin. Now assume that the M2M device has a certain level of connectivity, e.g. there are two connections available with at least 10 dB margin beyond what is needed for the required quality of service. The certain level of connectivity may be considered as a fulfilling the high connectivity state requirement if the margin has been stable over a time period. E.g. the margin was at least 10 dB during 95% of the time during the last 180 days, and variance of the margin was below a threshold Z.

At the same time, another M2M device with the same certain level of connectivity may be considered as not fulfilling the high connectivity state requirement for this other M2M device. As reason for this may be that in order to consider the other M2M device to fulfill the high connectivity state requirement, it may be required that the margin is very stable, i.e. variance of the margin should be less than P, where P=0.7*Z as an example. This means that P<Z.

In these manners, the estimated level of the connectivity for the M2M device is taking time dynamics of the quality of connections into account.

As a fourth example, the conditions relating to the at least one connection for the M2M device include, as mentioned, the correlation between connections for the M2M device. When the correlation of connections is below U for all or at least T number of connections, then the level of connectivity may be considered high.

As an example, connections which have many common elements or properties are considered to have high correlation, while connections which have different elements or properties have low correlation. Examples of elements include nodes, transport links, antennas, hardware configuration and the like. Examples of properties include radio frequency band, radio access technology or the like.

As a further example, assume a first path has a set of nodes x1 and links y1 and networks z1 to pass through, and a second path has accordingly x2/y2/z2 nodes/links/networks. A failure correlation, e.g. given as a value between 0 for no correlation and 1 for full correlation is determined e.g. by the M2M device. This can e.g. be done by determining how many of the x1/y1/z1 are common with x2/y2/z2. In this correlation also characteristics of the different elements in x/y/z may be considered. E.g. if the first and second paths share a common backhaul link, this link is determined to affect the correlation largely; at the same time, if the first and second paths share a common optical fiber transport link between two cities, this transport link may be considered as not affecting the correlation strongly, if it is determined that this link has a low probability of failure or a technical fallback mechanism in-build. Essentially this means that different nodes and links are assigned different weights depending on the individual reliability of the node and link when determining the overall failure correlation.

As a fifth example, the conditions relating to the at least one connection for the M2M device include, as mentioned, the network conditions impacting connections for the M2M device. The network conditions may be network load, radio interference, radio obstructions etc. The network load may refer to traffic generated from other users in a local area of the M2M device, number of active users etc. The radio interference may relate to harmful radio transmission received from other users, which decreases signal quality received at the M2M device. The radio obstructions may be if a user is in or behind a house which leads to weaker radio signals.

In further examples, the conditions relating to the at least one connection for the M2M device may include information about the mobility, e.g. stationary, limited movement, fully mobile, and capabilities of the M2M device, e.g. supported radio access, supported frequency bands, processing capabilities, power classes, etc.

Service Requirements

In a wireless communication system like LTE, the service requirements may be defined by a set of parameters relating to Quality of Service (QoS). In 3GPP Technical Specification (TS) 23.203, a set of QoS Class Indicators (QCI) are described. The service that is set up is thus associated with a certain QCI, in e.g. a range from 1 to 9. Each QCI describes for example acceptable delay and error rate for the associated service.

Service requirements are also defined for GSM, UTRAN and the like.

Figure 5:
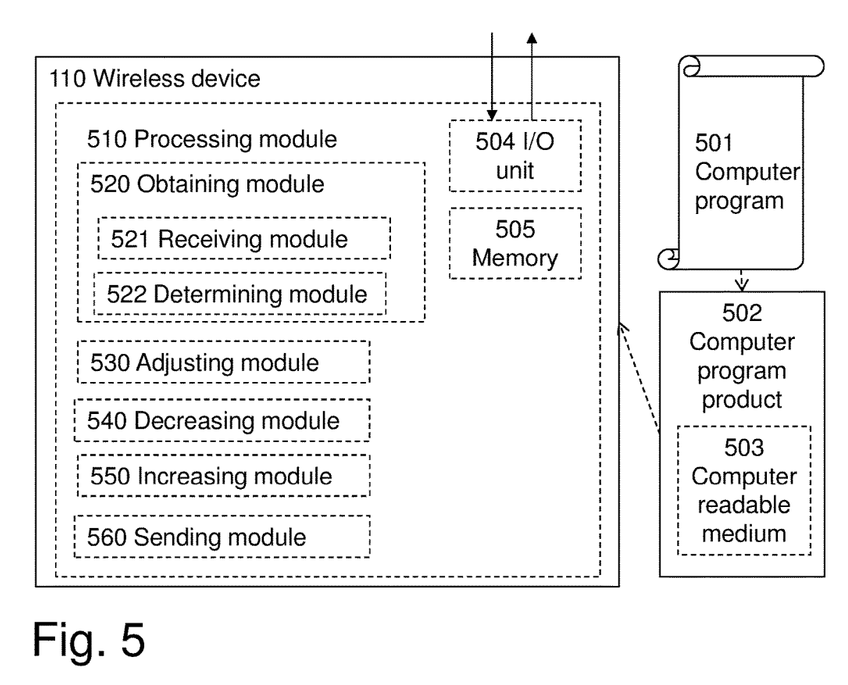
FIG. 5 is a block diagram illustrating embodiments of the wireless device, FIG. 6 a graph illustrating the amount of probe messages as a function of the estimated level of the connectivity.

With reference to FIG. 5, a schematic block diagram of the wireless device 110 is shown. The wireless device 110 is configured to perform the methods in FIG. 4. Thus, the wireless device 110 is configured to manage probe messages for verifying a required level of a connectivity for a service of the wireless device 110 towards the wireless network 100.

As mentioned, the required level of the connectivity relates to likelihood of maintaining the connectivity towards the wireless network 100.

According to some embodiments herein, the wireless device 110 may comprise a processing module 510. In further embodiments, the processing module 610 may comprise one or more of an obtaining module 520, a receiving module 521, a determining module 522, an adjusting module 530, a decreasing module 540, an increasing module 550 and a sending module 560.

The wireless device 110, the processing module 510 and/or the obtaining module 520 is configured to obtain an estimated level of the connectivity for the wireless device 110.

The wireless device 110, the processing module 510 and/or the receiving module 521 may be configured to receive the estimated level of the connectivity for the service from the wireless network 100.

The wireless device 110, the processing module 510 and/or the determining module 522 may be configured to determine the estimated level of the connectivity for the service.

The wireless device 110, the processing module 510 and/or the adjusting module 530 is configured to adjust an amount of the probe messages based on the required level of the connectivity and the estimated level of the connectivity. The probe messages are sent, by the wireless device 110, to the wireless network 100 for verification of the required level of the connectivity.

The amount of the probe messages may relate to one or more of:
a periodicity at which the probe messages are sent from the wireless device 110;
number of cells to which the probe messages are sent;
number of radio access technologies used when the probe messages are sent; and
number of frequencies used when the probe messages are sent.

The wireless device 110, the processing module 510 and/or the estimating module 520 may be configured to estimate the estimated level of the connectivity based on one or more of number of connections for the wireless device 110, and quality of connections for the wireless device 110.

The wireless device 110, the processing module 510 and/or the decreasing module 540 may be configured to decrease the amount of probe messages when a difference between the required level of the connectivity and the estimated level of the connectivity exceeds a threshold value. Moreover, the wireless device 110, the processing module 510 and/or the increasing module 550 may be configured to increase the amount of probe messages when the difference approaches the threshold value.

The wireless device 110, the processing module 510 and/or the sending module 560 may be configured to send a message indicating the amount of the probe messages to the wireless network 100.

The wireless device 110 may further comprise an Input/output (I/O) unit 504 configured to send and/or receive the probe messages, the message indicating the amount of the probe messages and other messages, values, indications and the like as described herein. The I/O unit 504 may comprise the sending module 560, a transmitter and/or a receiver.

Furthermore, the wireless device 110 may comprise a memory 505 for storing software to be executed by, for example, the processing module when the processing module is implemented as a hardware module comprising at least one processor or the like.

FIG. 5 also illustrates software in the form of a computer program 501 for managing probe messages. The computer program 501 comprises computer readable code units which when executed on the wireless device 110 causes the wireless device 110 to perform the method according to FIG. 4.

Finally, FIG. 5 illustrates a computer program product 502, comprising computer readable medium 503 and the computer program 501 as described directly above stored on the computer readable medium 503.

As used herein, the term "processing module" may refer to a processing circuit, a processing unit, a processor, an Application Specific integrated Circuit (ASIC), a Field-Programmable Gate Array (FPGA) or the like. As an example, a processor, an ASIC, an FPGA or the like may comprise one or more processor kernels. In some examples, the processing module may be embodied by a software module or hardware module. Any such module may be a determining means, estimating means, capturing means, associating means, comparing means, identification means, selecting means, receiving means, transmitting means or the like as disclosed herein. As an example, the expression "means" may be a module, such as a determining module, selecting module, etc.

As used herein, the expression "configured to" may mean that a processing circuit is configured to, or adapted to, by means of software configuration and/or hardware configuration, perform one or more of the actions described herein.

As used herein, the term "memory" may refer to a hard disk, a magnetic storage medium, a portable computer diskette or disc, flash memory, random access memory (RAM) or the like. Furthermore, the term "memory" may refer to an internal register memory of a processor or the like.

As used herein, the term "computer readable medium" may be a Universal Serial Bus (USB) memory, a DVD-disc, a Blu-ray disc, a software module that is received as a stream of data, a Flash memory, a hard drive, a memory card, such as a Memory Stick, a Multimedia Card (MMC), etc.

As used herein, the term "computer readable code units" may be text of a computer program, parts of or an entire binary file representing a computer program in a compiled format or anything there between.

As used herein, the terms "number", "value" may be any kind of digit, such as binary, real, imaginary or rational number or the like. Moreover, "number", "value" may be one or more characters, such as a letter or a string of letters. "number", "value" may also be represented by a bit string.

As used herein, the expression "in some embodiments" has been used to indicate that the features of the embodiment described may be combined with any other embodiment disclosed herein.

Even though embodiments of the various aspects have been described, many different alterations, modifications and the like thereof will become apparent for those skilled in the art. The described embodiments are therefore not intended to limit the scope of the present disclosure.

The invention claimed is:

1. A method, performed by a wireless device, for managing probe messages for verifying a required level of a connectivity for a service of the wireless device towards a wireless network, wherein the required level of the connectivity relates to likelihood of maintaining the connectivity towards the wireless network, wherein the method comprises:
    obtaining an estimated level of the connectivity for the service; and
    adjusting an amount of the probe messages based on the required level of the connectivity and the estimated level of the connectivity, wherein the probe messages are sent, by the wireless device, to the wireless network for verification of the required level of the connectivity.

2. The method of claim 1, wherein the amount of the probe messages relates to one or more of:
    a periodicity at which the probe messages are sent from the wireless device;
    number of cells to which the probe messages are sent;
    number of radio access technologies used when the probe messages are sent; and
    number of frequencies used when the probe messages are sent.

3. The method of claim 1, wherein the obtaining comprises receiving the estimated level of the connectivity for the service from the wireless network.

4. The method of claim 1, wherein the obtaining comprises determining the estimated level of the connectivity for the service.

5. The method of claim 1, wherein the determining of the estimated level of the connectivity is based on one or more of:
    number of connections for the wireless device; and
    quality of connections for the wireless device.

6. The method of claim 1, wherein the adjusting of the amount of probe messages comprises:
    decreasing the amount of probe messages when a difference between the required level of the connectivity and the estimated level of the connectivity exceeds a threshold value; and
    increasing the amount of probe messages when the difference approaches the threshold value.

7. The method of claim 1, wherein the method comprises:
    sending a message indicating the amount of the probe messages to the wireless network.

8. A wireless device configured to manage probe messages for verifying a required level of a connectivity for a service of the wireless device towards a wireless network, wherein the required level of the connectivity relates to likelihood of maintaining the connectivity towards the wireless network, wherein the wireless device comprises:
    processing circuitry; and
    a memory, wherein the memory stores computer instructions that, when executed by the processing circuitry, cause the wireless device to:
        obtain an estimated level of the connectivity for the wireless device; and
        adjust an amount of the probe messages based on the required level of the connectivity and the estimated level of the connectivity, wherein the probe messages are sent, by the wireless device, to the wireless network for verification of the required level of the connectivity.

9. The wireless device of claim 8, wherein the amount of the probe messages relates to one or more of:
    a periodicity at which the probe messages are sent from the wireless device;
    number of cells to which the probe messages are sent;
    number of radio access technologies used when the probe messages are sent; and
    number of frequencies used when the probe messages are sent.

10. The wireless device of claim 8, wherein the memory comprises computer instructions that cause the wireless device to receive the estimated level of the connectivity for the service from the wireless network.

11. The wireless device of claim 8, wherein the memory comprises computer instructions that cause the wireless device to determine the estimated level of the connectivity for the service.

12. The wireless device of claim 8, wherein the memory comprises computer instructions that cause the wireless device to estimate the estimated level of the connectivity based on one or more of:
    number of connections for the wireless device; and
    quality of connections for the wireless device.

13. The wireless device of claim 8, wherein the memory comprises computer instructions that cause the wireless device to:
    decrease the amount of probe messages when a difference between the required level of the connectivity and the estimated level of the connectivity exceeds a threshold value; and
    increase the amount of probe messages when the difference approaches the threshold value.

14. The wireless device of claim 8, wherein the memory comprises computer instructions that cause the wireless device to:
    send a message indicating the amount of the probe messages to the wireless network.

15. A non-transitory computer-readable medium comprising, stored thereupon, a computer program, wherein the computer program comprises computer-readable code units that, when executed on a wireless device, cause the wireless device to manage probe messages for verifying a required level of a connectivity for a service of the wireless device towards a wireless network, wherein the required level of the connectivity relates to likelihood of maintaining the connectivity towards the wireless network, by:

obtaining an estimated level of the connectivity for the service; and adjusting an amount of the probe messages based on the required level of the connectivity and the estimated level of the connectivity, wherein the probe messages are sent, by the wireless device, to the wireless network for verification of the required level of the connectivity.

* * * * *